(12) United States Patent
Musgrove et al.

(10) Patent No.: US 10,495,750 B1
(45) Date of Patent: Dec. 3, 2019

(54) SPECTRAL REPLACEMENT TO MITIGATE INTERFERENCE FOR MULTI-PASS SYNTHETIC APERTURE RADAR

(71) Applicant: National Technology & Engineering Solutions of Sandia, LLC, Albuquerque, NM (US)

(72) Inventors: Cameron Musgrove, Albuquerque, NM (US); Richard M. Naething, Albuquerque, NM (US); Douglas L. Bickel, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 470 days.

(21) Appl. No.: 15/351,949

(22) Filed: Nov. 15, 2016

Related U.S. Application Data

(60) Provisional application No. 62/257,619, filed on Nov. 19, 2015.

(51) Int. Cl.
*G01S 13/90* (2006.01)
(52) U.S. Cl.
CPC .................... *G01S 13/904* (2019.05)
(58) Field of Classification Search
CPC ................................................. G01S 13/9035
USPC ........................................................ 342/25 F
See application file for complete search history.

(56) References Cited

U.S. PATENT DOCUMENTS

| | | | | |
|---|---|---|---|---|
| 4,924,229 A * | 5/1990 | Eichel | ................ | G01S 13/9017 342/25 E |
| 4,999,635 A * | 3/1991 | Niho | ................... | G01S 13/9011 342/25 D |
| 5,531,117 A * | 7/1996 | Fortes | ................ | G01S 7/52049 600/442 |
| 5,546,084 A * | 8/1996 | Hindman | ................ | G01S 7/411 342/25 F |
| 5,854,602 A * | 12/1998 | Stankwitz | ............. | G01S 13/904 342/25 F |
| 5,898,399 A * | 4/1999 | Carrara | ................... | G01S 13/90 342/25 A |
| 6,011,505 A * | 1/2000 | Poehler | ............... | G01S 13/9023 342/25 C |

(Continued)

OTHER PUBLICATIONS

Pinheiro, et al., "Reconstruction of Coherent Pairs of Synthetic Aperture Radar Data Acquired in Interrupted Mode", In IEEE Transactions on Geoscience and Remote Sensing, vol. 53, No. 4, Apr. 2015, pp. 1876-1893.

*Primary Examiner* — Vladimir Magloire
*Assistant Examiner* — Nuzhat Pervin
(74) *Attorney, Agent, or Firm* — Medley, Behrens & Lewis, LLC

(57) ABSTRACT

Various technologies for mitigating interference artifacts in multi-pass synthetic aperture radar (SAR) imagery are described herein. First and second phase histories corresponding to first and second SAR passes over a scene are processed in image and phase-history domains to correct for spatially-variant and constant phase offsets between the phase histories that can be caused by known and unknown variations in motion of a SAR platform between passes. Data samples from one phase history can then be replaced with data samples from the other phase history to remove artifacts and distortions caused by sources of interference in the scene.

20 Claims, 6 Drawing Sheets

(56) References Cited

U.S. PATENT DOCUMENTS

| | | | | |
|---|---|---|---|---|
| 6,028,549 | A * | 2/2000 | Buckreuss | G01S 7/36 162/196 |
| 6,037,892 | A * | 3/2000 | Nikias | G01S 15/89 342/25 F |
| 6,046,695 | A * | 4/2000 | Poehler | G01S 13/90 342/25 A |
| 6,646,593 | B1 * | 11/2003 | Garren | G01S 13/904 342/179 |
| 6,781,541 | B1 * | 8/2004 | Cho | G01S 13/904 342/25 D |
| 6,873,285 | B2 * | 3/2005 | Carrara | G01S 13/904 342/25 R |
| 6,919,839 | B1 * | 7/2005 | Beadle | G01S 7/025 342/118 |
| 7,245,250 | B1 * | 7/2007 | Kalayeh | G01S 13/9011 342/189 |
| 7,259,715 | B1 * | 8/2007 | Garren | G01S 13/904 342/179 |
| 7,397,418 | B1 * | 7/2008 | Doerry | G01S 13/9011 342/196 |
| 7,436,349 | B1 * | 10/2008 | Doerry | G01S 13/904 342/25 A |
| 7,456,780 | B1 * | 11/2008 | Garren | G01S 7/415 342/25 A |
| 7,515,098 | B1 * | 4/2009 | Garren | G01S 13/904 342/179 |
| 7,551,119 | B1 * | 6/2009 | Doerry | G01S 13/904 342/25 R |
| 8,154,435 | B2 * | 4/2012 | Pett | G01S 7/295 342/176 |
| 8,242,949 | B2 * | 8/2012 | DeLaurentis | G01S 13/90 342/25 A |
| 8,665,132 | B2 * | 3/2014 | Ranney | G01S 13/90 342/179 |
| 8,824,544 | B2 * | 9/2014 | Nguyen | G01S 13/0209 375/224 |
| 9,110,167 | B2 * | 8/2015 | Cho | G01S 13/904 |
| 9,146,312 | B1 * | 9/2015 | Rush | G01S 13/90 |
| 9,417,323 | B2 * | 8/2016 | Carande | G01S 13/9023 |
| 9,791,563 | B1 * | 10/2017 | Thompson | G01S 13/52 |
| 2004/0021598 | A1 * | 2/2004 | Garren | G01S 13/904 342/25 R |
| 2005/0007269 | A1 * | 1/2005 | Carrara | G01S 13/904 342/25 R |
| 2006/0284762 | A1 * | 12/2006 | Garren | G01S 13/904 342/179 |
| 2008/0042893 | A1 * | 2/2008 | Connell | G01S 13/9011 342/25 F |
| 2010/0045513 | A1 * | 2/2010 | Pett | G01S 7/295 342/25 C |
| 2010/0149024 | A1 * | 6/2010 | Connell | G01S 13/9011 342/25 F |
| 2011/0133983 | A1 * | 6/2011 | Connell | G01S 13/9011 342/25 F |
| 2011/0163912 | A1 * | 7/2011 | Ranney | G01S 7/414 342/25 F |
| 2014/0077989 | A1 * | 3/2014 | Healy, Jr. | G01S 13/904 342/25 F |
| 2015/0042510 | A1 * | 2/2015 | Carande | G01S 13/9023 342/25 C |
| 2016/0084946 | A1 * | 3/2016 | Turbide | G01S 7/497 356/4.01 |

* cited by examiner

SPECTRAL REPLACEMENT TO MITIGATE INTERFERENCE FOR MULTI-PASS SYNTHETIC APERTURE RADAR

RELATED APPLICATION

This application claims priority to U.S. Provisional Patent Application No. 62/257,619, filed on Nov. 19, 2015, and entitled "SPECTRAL REPLACEMENT TO MITIGATE INTERFERENCE FOR MULTI-PASS SAR", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Synthetic aperture radar (SAR) is used to create images of landscapes and other scenes. Aircraft equipped with SAR can fly over an area of interest and collect SAR data that can be used to image the area. Various sources of interference, such as radio frequency transmitters, weather radar stations, television transmission antennae, etc., may be present in the area of interest. Electromagnetic emissions from these sources of interference are often received simultaneously with a desired radar echo return by SAR antennae. Thus, SAR data collected by a SAR antenna frequently includes both the desired radar echo return and additional interference. When images are generated from the SAR data, the interference creates image artifacts. Conventional techniques for removing interference from SAR data, such as notch-filtering, can cause further degradation in image quality of images generated from the SAR data.

SUMMARY

The following is a brief summary of subject matter that is described in greater detail herein. This summary is not intended to be limiting as to the scope of the claims.

Various technologies for mitigating image artifacts in multi-pass SAR imagery caused by interference, mitigation of interference using conventional techniques, or by interrupted SAR data collection are described herein. First and second phase histories corresponding to SAR returns during first and second passes of a SAR platform over an area of interest are received at a computing device. The computing device can correct for phase differences between the first and second phase histories arising from scene topography and known and unknown motion of the SAR platform during SAR data collection. The computing device can then simultaneously replace missing data samples in each of the phase histories with data samples from the other phase history in order to repair image artifacts.

The first and second phase histories can first be resampled to a common coordinate system. Filtered or otherwise missing data samples in each of the first and second phase histories can be matched in the other of the phase histories. A spatially-variant phase offset between the first and second phase histories is corrected by processing first and second images generated from the first and second phase histories, respectively. The images are processed by registering the first image to the second image and then applying an unwrapped phase of a maximum likelihood coherence estimator to the first image, thereby correcting a spatially-variant phase offset between the first image and the second image. A constant phase offset between the first and second phase histories can then be corrected by an iterative search process for a constant phase offset value that maximizes a magnitude of coherence between the first and second phase histories. The constant phase offset value is applied to a third phase history that is generated from the spatially-variant phase-corrected first image. Thus, the third phase history is a phase history that corresponds to the first pass of the SAR platform and that is phase-adjusted to the second phase history corresponding to the second pass of the SAR platform. Data values can then be substituted between the third and second phase histories to replace missing data caused by conventional interference mitigation techniques (e.g., notch filtering at an interference emitter's EM frequency), thereby "repairing" artifacts in images generated from the third and second phase histories.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
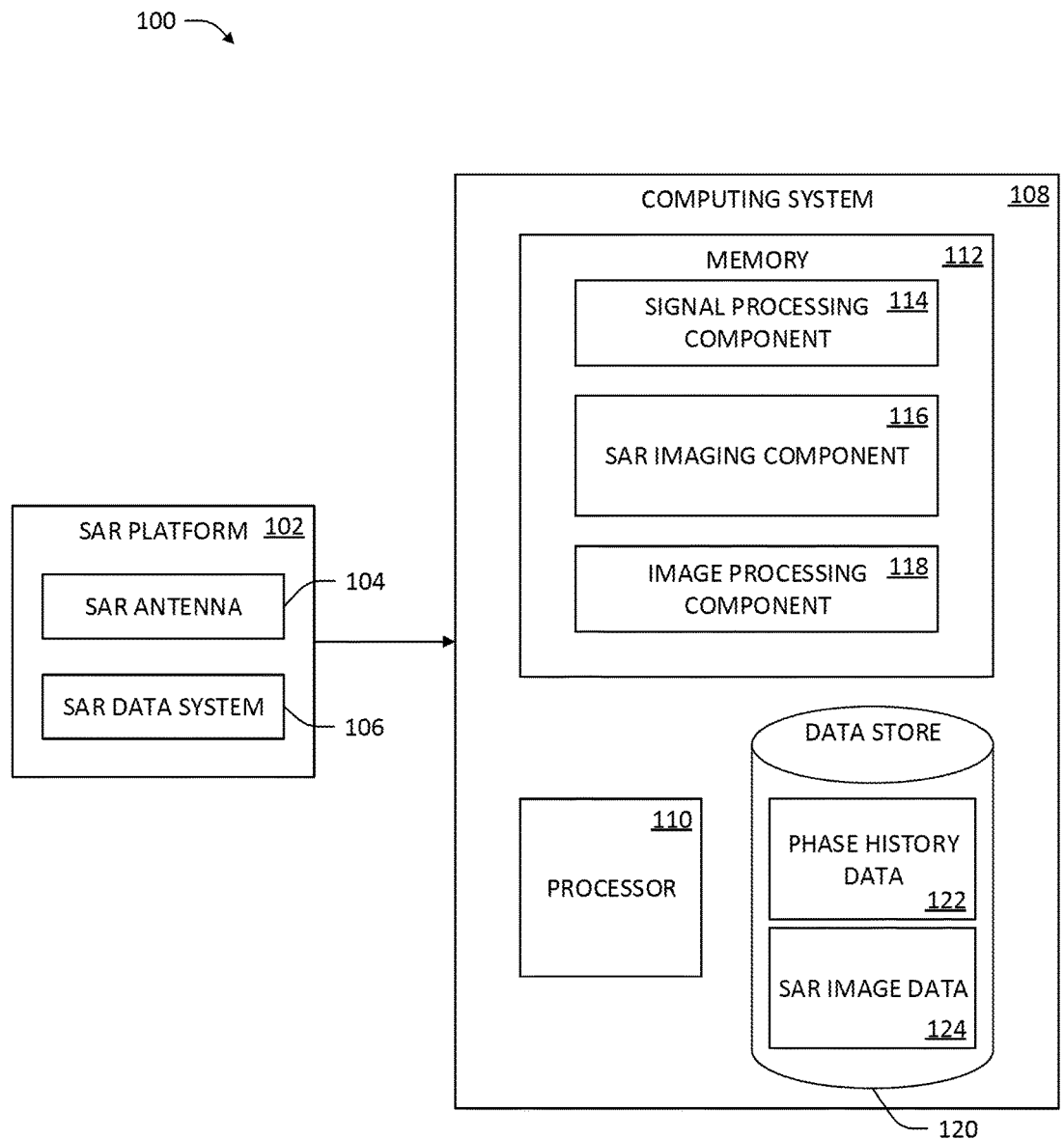
FIG. 1 is a functional block diagram of an exemplary system that facilitates mitigation of artifacts in multi-pass SAR imagery.

Various technologies pertaining to mitigation of interference artifacts and distortion in multi-pass synthetic aperture radar (SAR) imagery are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates mitigation of interference in synthetic aperture radar (SAR) imagery is illustrated. The system 100 includes a SAR platform 102 on which is mounted a SAR antenna 104 that is coupled to a SAR data system 106. In exemplary embodiments, the SAR platform 102 can be an aircraft, a spacecraft, or other such platform. The SAR platform 102 can traverse an area of interest in connection with imaging the area via SAR imaging techniques. The SAR antenna 104 emits scanning pulses of electromagnetic (EM) radiation at ground cover and other objects in the area of interest, and receives echo returns of the scanning pulses that are reflected by the ground cover and the objects in the area. The SAR data system 106 receives signals from the SAR antenna 104 and performs various signal processing operations in order to generate SAR phase histories that can be used to generate SAR-based images of the area.

The SAR antenna 104 can also receive EM interference signals generated by various sources of EM emission in the area of interest. These sources of interference can be radio or television antennae, ground-based radar stations, etc. The EM interference signals received by the SAR antenna 104 interfere with and distort the echo returns, which in turn can cause artifacts in SAR images generated based upon those returns. SAR systems can be equipped to filter out these interference signals to mitigate image artifacts. Filtering out interference, however, can cause other artifacts and distortion in SAR images. The system 100 can mitigate artifacts and distortion caused by filtering interference by replacing data generated during a first pass of the SAR platform 102 traversing the area of interest with data generated during a second pass of the SAR platform 102 traversing the area of interest, or vice versa.

In some SAR imaging applications (e.g., coherent change detection imagery), a SAR platform 102 performs multipass data collection by traversing the area of interest at a plurality of different times, and generating SAR data based upon echo returns from the SAR antenna 104 in each pass. Where features in the area of interest tend to be stable over time (e.g., terrain, trees, buildings, etc.), data from one collection time can be replaced with data for another collection time without obscuring potential features of interest. A difference in position and acceleration of the SAR platform 102 from one pass to another can change an interferometric baseline, which is used to generate SAR imagery, on the order of tens or hundreds of radar wavelengths. In airborne SAR implementations, for example, the SAR platform 102 can be subject to changes in position based upon varying weather conditions, air turbulence, piloting variations, etc. The system 100 implements a phase correction between datasets derived from a first pass of the SAR platform 102 and datasets derived from a second pass of the SAR platform 102 in order to allow direct replacement of data values between the two datasets.

The system 100 further comprises a computing system 108 that implements a phase correction and replaces missing data values between datasets caused by filtering interference in the datasets. The computing system 108 comprises a processor 110 and memory 112 comprising a signal processing component 114, a SAR imaging component 116, and an image processing component 118. The computing system 108 further comprises a data store 120 that can be used in connection with storing phase history data 122 and SAR image data 124 for processing or presentment to a user. The signal processing component 114, the SAR imaging component 116, and the image processing component 118 together perform functionality that corrects for phase differences between phase history datasets to allow direct replacement of data values between the datasets. The signal processing component 114 performs various aspects of this functionality involving signal processing operations on phase history data. The SAR imaging component 116 performs various aspects of this functionality involving formation of SAR images, or transforming SAR data between a phase-history domain and an image domain. The image processing component 118 performs various aspects of this functionality involving processing SAR image data.

Details of operation of the system 100 are now described. The SAR platform 102 makes multiple scanning passes over an area of interest in order to collect SAR data for use in SAR imaging of the area. The SAR platform 102 can be equipped with various devices and equipment that are used to ensure that a similar path is traversed by the SAR platform 102 in each pass over the area of interest. As the SAR platform 102 traverses the area of interest, the SAR antenna 104 emits scanning pulses, and receives echo returns and other EM radiation, such as EM emissions from sources of interference. The SAR data system 106 receives signals from the SAR antenna 104 and performs processing operations to generate phase history data corresponding to each pass of the SAR platform 102. Phase history data is said to correspond to a pass of the SAR platform 102, or to a collection time, if the phase history data is generated based upon echo return signals received by the SAR antenna during the pass or the collection time.

First and second phase history data for respective first and second passes of the SAR platform 102 over the area of interest is received at the computing system 108. The signal processing component 114 resamples the first and second phase histories to a common coordinate grid. The signal processing component 114 resamples the first and second phase histories based upon information pertaining to known motion of the SAR platform 102. For example, the signal processing component 114 can resample the first phase history based upon a known deviation in flight path of the SAR platform 102 from a first pass to a nominal collection geometry.

After the phase histories are resampled to the common coordinate grid, the signal processing component 114 matches sample indices corresponding to samples desirably replaced in each of the phase histories. Data samples in each of the phase histories may be desirably replaced for a variety of reasons. For example, the first phase history can be missing data samples corresponding to a certain frequency or range of frequencies if a filter has been applied to the first phase history to filter out an interference signal. Data samples may also be missing as a result of gaps in collection of SAR returns (e.g., gaps in SAR data collection caused by intentional or unintentional interruptions in output of scanning pulses by the SAR antenna 104). In another example, one of the phase histories can have data samples that are known to be likely to cause an artifact, distortion, or other degradation of an image generated from the one phase history. To increase coherence between first and second images generated based upon, respectively, the first and second phase histories, missing data samples, or samples otherwise desirably replaced in each phase history, are filtered from both phase histories by the signal processing component 114. By way of example, if the first phase history is missing a first data sample that corresponds to a first location in a first SAR image, the signal processing component 114 can identify a second data sample in the second phase history that corresponds to the same first location in a second SAR image based upon the matched sample indices. Responsive to identifying the second data sample, the signal processing component 114 can filter the second data sample from the second phase history. The signal processing component 114 can repeat the filtering of the phase histories for as many missing or desirably replaced data samples as exist in each of the first and second phase histories, until each of the first and second phase histories has filtered data values at same locations as the other phase history. The signal processing component 114 can further filter a greater number of data samples in the first and second phase histories in order to increase the coherence of the first and second images generated therefrom.

After the signal processing component 114 matches filtered data between the first and second phase histories, a spatially-variant phase offset between the first and second phase histories can be computed. The spatially-variant phase offset can be computed based upon jointly image processing SAR images formed from the filtered phase histories. The joint image processing of the SAR images can include computing autofocus for the SAR images, registering one of the SAR images to another, and calculating an unwrapped phase of a coherence estimator between the registered first and second SAR images.

The SAR imaging component 116 forms first and second SAR images based upon the first and second filtered phase histories. The SAR imaging component 116 forms images based upon phase histories using an invertible image formation algorithm (e.g., the polar format algorithm). The SAR imaging component 116 also forms a third image based upon one of the resampled, unfiltered first and second phase histories. In correcting a spatially-variant phase offset between the first and second phase histories, the first and second images are jointly processed to compute transform operations that can correct the spatially-variant phase offset. The transform operations are then applied to the third image. In the discussion that follows, it will be assumed that the third image is generated by the SAR imaging component 116 based upon the first resampled, unfiltered phase history. It is to be understood, however, that the SAR imaging component can generate the third image based upon the second resampled, unfiltered phase history. In embodiments in which the third image is based upon the second resampled, unfiltered phase history, transform operations described below as being calculated with respect to the first image can instead be calculated with respect to the second image.

The image processing component 118 performs various image processing operations on the first and second images in order to compute transforms that can be applied to the third image. The image processing component 118 calculates and applies autofocus for each of the first and second images to facilitate registration of the images. The image processing component 118 also applies the autofocus calculated for the first image to the third image. The image processing component 118 can use a variety of autofocus algorithms to calculate the autofocus for each of the images. In one exemplary embodiment, the image processing component 118 can use a phase gradient autofocus algorithm.

The image processing component 118 can register the first and second images to one another in order to correct for spatially-variant shifts between them. Spatially-variant shifts between the images can result from layover and differences in motion of the SAR platform 102 between the first pass and the second pass over the area of interest during SAR data collection. The registration can proceed in two steps starting with a coarse registration between the first image and the second image and finishing with a fine registration between corresponding segments of the first and second images. The image processing component 118 can perform the coarse registration of the first image to the second image based upon execution of an image registration algorithm over the entirety of the first and second images. The image processing component 118 can then perform a fine registration of the first image to the second image by registering corresponding segments of the first and second images. In an illustrative example, the image processing component 118 can perform the fine registration of the first image to the second image by registering quadrants of the first image to quadrants of the second image. Thus, the image processing component 118 can register an upper-right quadrant of the first image to an upper-right quadrant of the second image, a lower-right quadrant of the first image to a lower-right quadrant of the second image, and so on for each of the four quadrants of each of the first and second images. It is to be understood that the fine registration performed by the image processing component 118 can employ substantially any number of image segments. The image processing component 118 can employ any image registration algorithm compatible with the registration processes described herein. Transformation operations applied by the image processing component 118 to the segments of the first image in the fine registration process are also applied to the third image.

After registering the first and second images, the image processing component 118 computes a maximum likelihood coherence estimator between the first and second images. In an exemplary embodiment, the maximum likelihood coherence estimator can be defined by the equation:

$$\hat{\mu} = \frac{\sum_{n=1}^{L-1} x_{1,n} x_{2,n}^*}{\sqrt{\sum_{n=1}^{L-1} |x_{1,n}|^2 \sum_{n=1}^{L-1} |x_{2,n}|^2}}$$

In other exemplary embodiments wherein the first and second images are based upon polarimetric SAR data, the coherence estimator can be a polarimetric coherence estimator.

The image processing component 118 calculates the maximum likelihood coherence estimator on a pixel-bypixel basis between the first and second images. Thus, for each corresponding pixel location (e.g., uppermost left pixel) in the first and second images, the image processing component 118 calculates a value of the maximum likelihood coherence estimator. In the equation above, for a given pixel location L is a number of adjacent pixels to the given pixel location, $z_{1,n}$ is a value of an nth pixel of the first image, and $x_{2,n}$ is a value of an nth pixel of the second image.

The image processing component 118 unwraps a two-dimensional phase of the phase of the maximum likelihood coherence estimator between the first and second images in order to determine spatially-variant phase corrections that can be applied to the third image. The image processing component 118 can calculate the unwrapped two-dimensional phase of the maximum likelihood coherence estimator according to any of a variety of phase unwrapping algorithms. The image processing component 118 computes an unwrapped phase value for each of the pixel locations for which the maximum likelihood coherence estimator is calculated. The unwrapped phase value for each of the pixel locations is based upon the values of the coherence estimator for each pixel location. The image processing component 118 then directly multiplies pixel values of the third image by the unwrapped phase values for the corresponding pixel locations. For example, the two-dimensional unwrapped phase value of the coherence estimator for an uppermost left pixel of the first and second images can be multiplied by a pixel value of an uppermost left pixel of the third image. By multiplying pixels of the third image by the unwrapped phase of the maximum likelihood coherence estimator, the image processing component 118 corrects for a spatially-variant phase difference between the first and second images, corresponding to first and second scanning passes of the SAR platform 102, respectively. Thus, the third image can be described as a spatially-variant-phase-corrected image corresponding to the first pass of the SAR platform 102.

Once the image processing component 118 has output the spatially-variant-phase-corrected third image, a constant phase offset between phase history data corresponding to the third and second images may remain. The computing system 108 can correct for the constant phase offset by analyzing a phase history of the spatially-variant-phase-corrected third image with respect to the resampled second phase history. The SAR imaging component 116 executes a transform over the spatially-variant-phase-corrected third image to generate a corresponding third phase history. The transform executed by the SAR imaging component 116 is an inverse of the transform executed by the SAR imaging component 116 in connection with generating the third image based upon the resampled first phase history. The signal processing component 114 then computes a constant phase correction for a constant phase offset between the third phase history (i.e., a spatially-variant-phase-corrected phase history pertaining to a first pass of the SAR platform 102) and the resampled second phase history.

The signal processing component 114 and the image processing component 118 can compute the constant phase correction by iteratively calculating a magnitude of a coherence between an image formed from the third phase history and an image generated from the resampled second phase history to find a constant phase correction value that approximately maximizes the magnitude of the coherence. The signal processing component 114 initially replaces data in the resampled second phase history with data at a corresponding location in the third phase history. The signal processing component 114 can replace the data in the resampled second phase history based upon locations of data filtered by the signal processing component 114 in the process of matching sample indices between the first and second phase histories as described above. In each iteration, the signal processing component 114 changes a value of a constant phase correction applied to the third phase history. The SAR imaging component 116 then forms an image from the third phase history and an image from the resampled second phase history. The image processing component 118 computes a magnitude of the coherence between the image formed from the third phase history and the image formed from the resampled second phase history. In an example, the signal processing component 114 can change the value of the constant phase correction by a fixed amount in each iteration. For each iteration, the image processing component 118 can identify whether the magnitude of the coherence is greater than or less than the magnitude of the coherence in the previous iteration. The signal processing component 114 and the image processing component 118 can continue to iteratively calculate the magnitude of the coherence between the image formed from the third phase history and the image formed from the resampled second phase history until an iteration yields a lower coherence magnitude than a previous iteration. In another example, the signal processing component 114 and the image processing component 118 can continue to iteratively calculate the magnitude of the coherence until a relative maximum value of the magnitude of the coherence is reached. Once an approximate maximum value of the magnitude of the coherence between the third phase history and the resampled second phase history is reached, the signal processing component 114 can retain the value of the constant phase correction that maximized the coherence. The signal processing component 114 applies the coherence-maximizing value of the constant phase correction to the third phase history, yielding a complete-phase-corrected phase history.

Once the constant phase correction is applied, phase history values for matching sample indices may be freely substituted between the complete-phase-corrected phase history and the resampled second phase history in order to mitigate artifacts due to interference or interference filtering with respect to either or both of the first and second scanning passes of the SAR platform 102. In another exemplary embodiment, pixel values can be substituted between a phase-corrected image derived from the complete-phase-corrected phase history and an image derived from the resampled second phase history, wherein a substitute value for a pixel in one of the images is taken from a pixel at a corresponding pixel location in the other of the images.

Figure 2:
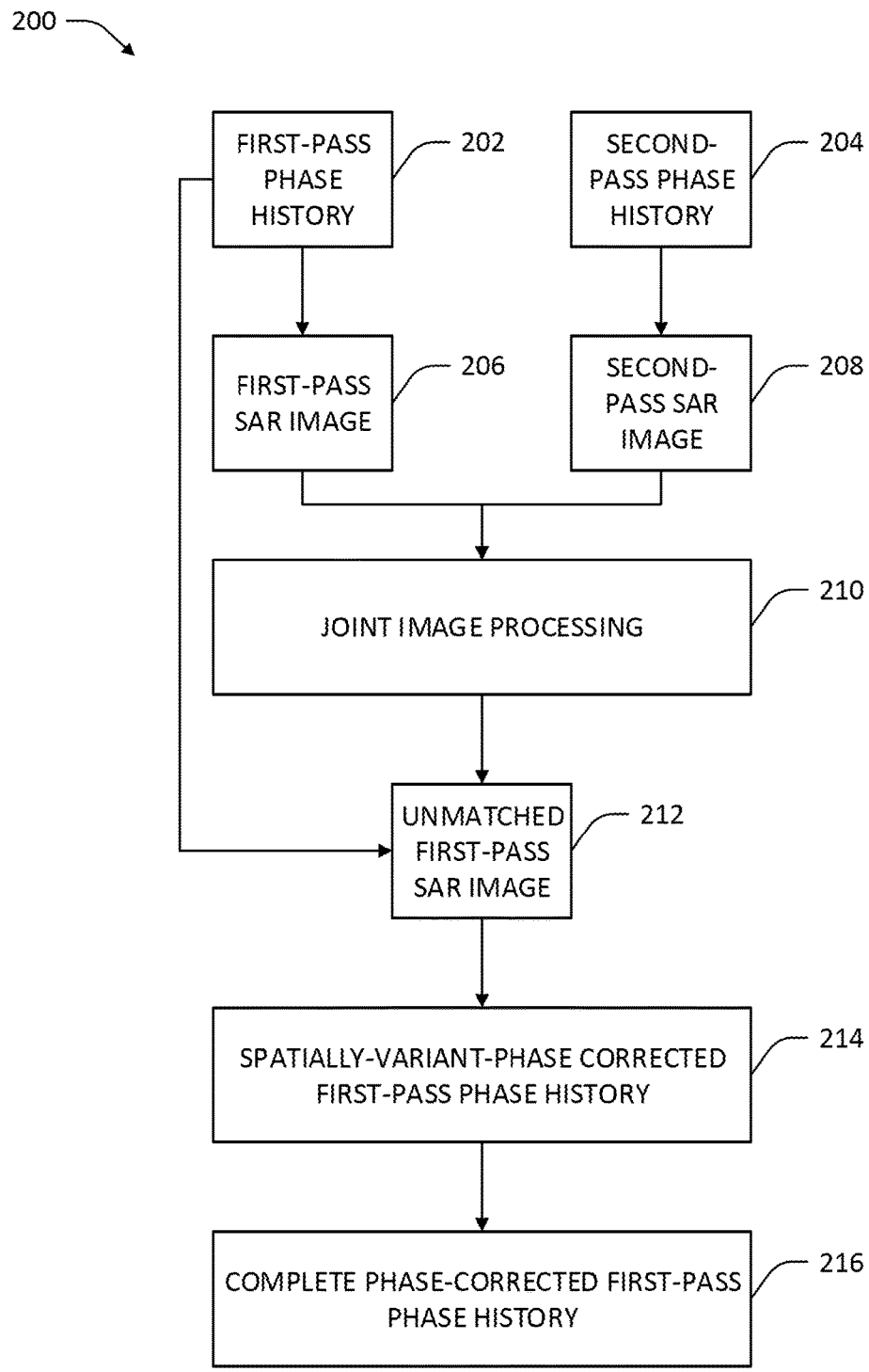
FIG. 2 is an exemplary data flow diagram for a process of mitigating artifacts in multi-pass SAR imagery.

Referring now to FIG. 2, an exemplary data flow diagram 200 is illustrated. The data flow diagram 200 shows a flow of SAR data through signal and image processing stages in connection with correcting phase discontinuities between first- and second-pass SAR phase histories. Processing begins with a first-pass phase history 202 and a second-pass phase history 204. The phase histories 202-204 correspond to the same scene at two different times. In other words, the phase histories 202-204 comprise a SAR return from a first SAR scan of the scene at a first time (i.e., first pass) and a SAR return from a second SAR scan of the scene at a second time (i.e., second pass), respectively. The phase histories 202-204 are each processed by a computing system to correct for various known phase differences and to facilitate later image processing. As a part of the processing of the phase histories 202-204, missing data sample indices are matched such that if there exists a filtered data sample at a first portion of the first-pass phase history 202, then a data sample at a corresponding portion of the second-pass phase history 204 will be filtered from the second-pass phase history 204 and vice versa. After this processing, the first-pass phase history is transformed to a SAR image 206 corresponding to the first pass, and the second-pass phase history 204 is transformed to a SAR image 208 corresponding to the second pass. The first-pass SAR image 206 and the second-pass SAR image 208 therefore have missing samples corresponding to same locations in the images 206-208 by virtue of the phase history processing.

The first-pass image 206 and the second-pass image 208 then undergo joint image processing at 210 in order to correct for spatially-variant phase discontinuities between the first-pass phase history 202 and the second-pass phase history 204. In the joint image processing 210, various transformations to correct a spatially-variant phase between the first-pass image 206 and the second-pass image 208 are computed. These transformations are then applied to an unmatched first-pass SAR image 212 that is formed from the first-pass phase history 202 prior to matching of missing data sample indices. Thus, transform operations—computed based upon the joint processing 210 of the missing-data-sampled-matched first-pass 206 and second-pass 208 SAR images—are applied to the unmatched first-pass SAR image 212, which does not have missing data samples matched with the second-pass image 208. Application of the transform operations to the unmatched first-pass SAR image 212 corrects for a spatially-variant phase offset between data collected by a SAR antenna in the first pass and data collected by the SAR antenna in the second pass. After transform operations are applied to the image 212, the image 212 can be transformed back to a phase history corresponding to the first-pass, wherein the phase history is a spatially-variant-phase corrected first-pass phase history 214. A remaining constant phase offset between the spatially-variant-phase corrected first-pass phase history 214 and the second-pass phase history 204 can be computed. A constant phase offset correction can then be applied to the spatially-variant-phase corrected first-pass phase history 214 to get a complete-phase-corrected first-pass phase history 216. Data values missing from the second-pass phase history 204 can then be directly replaced with data values at a corresponding location in the phase-corrected first-pass phase history 216.

Figure 3:
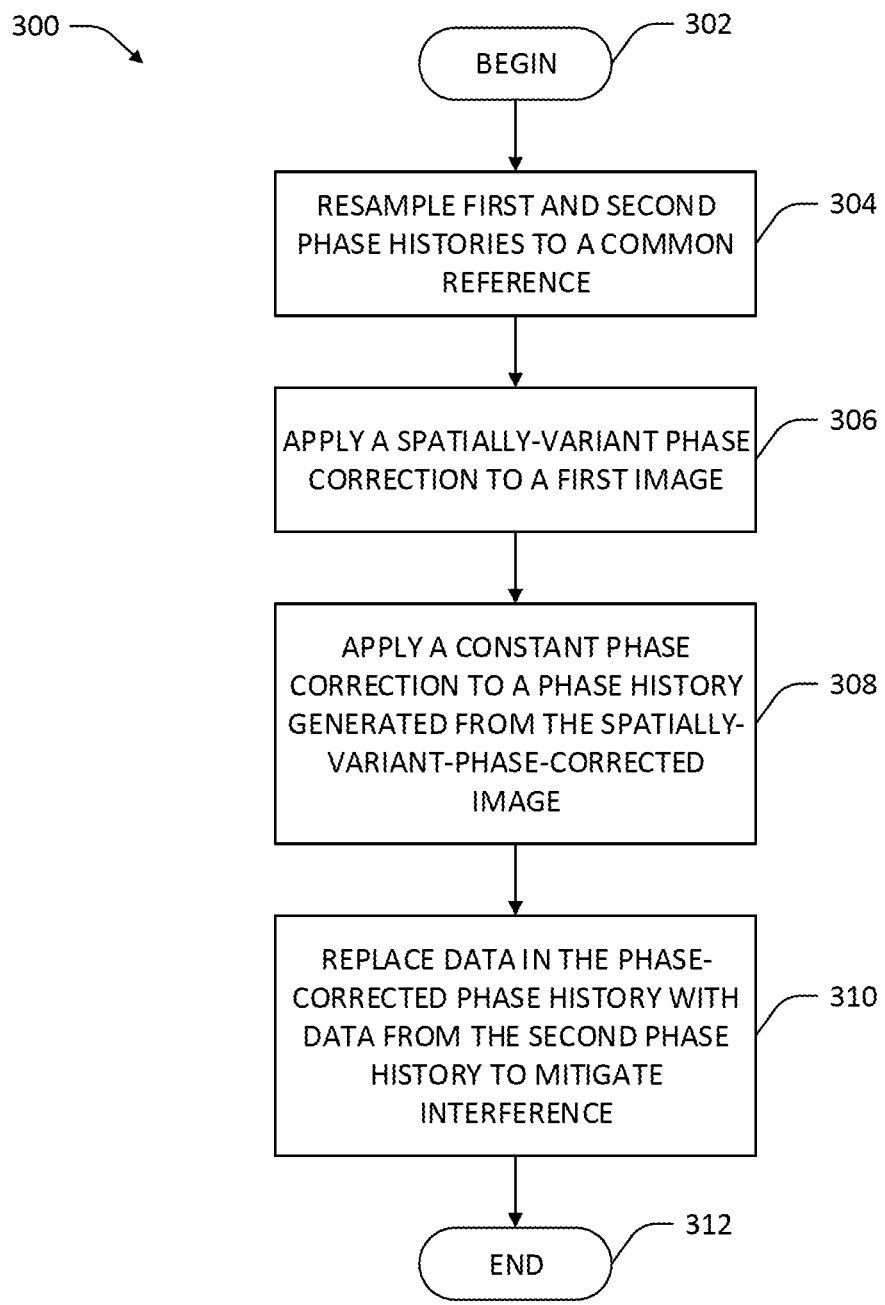
FIG. 3 is a flow diagram that illustrates an exemplary methodology for mitigating artifacts in multi-pass SAR imagery.
Figure 4:
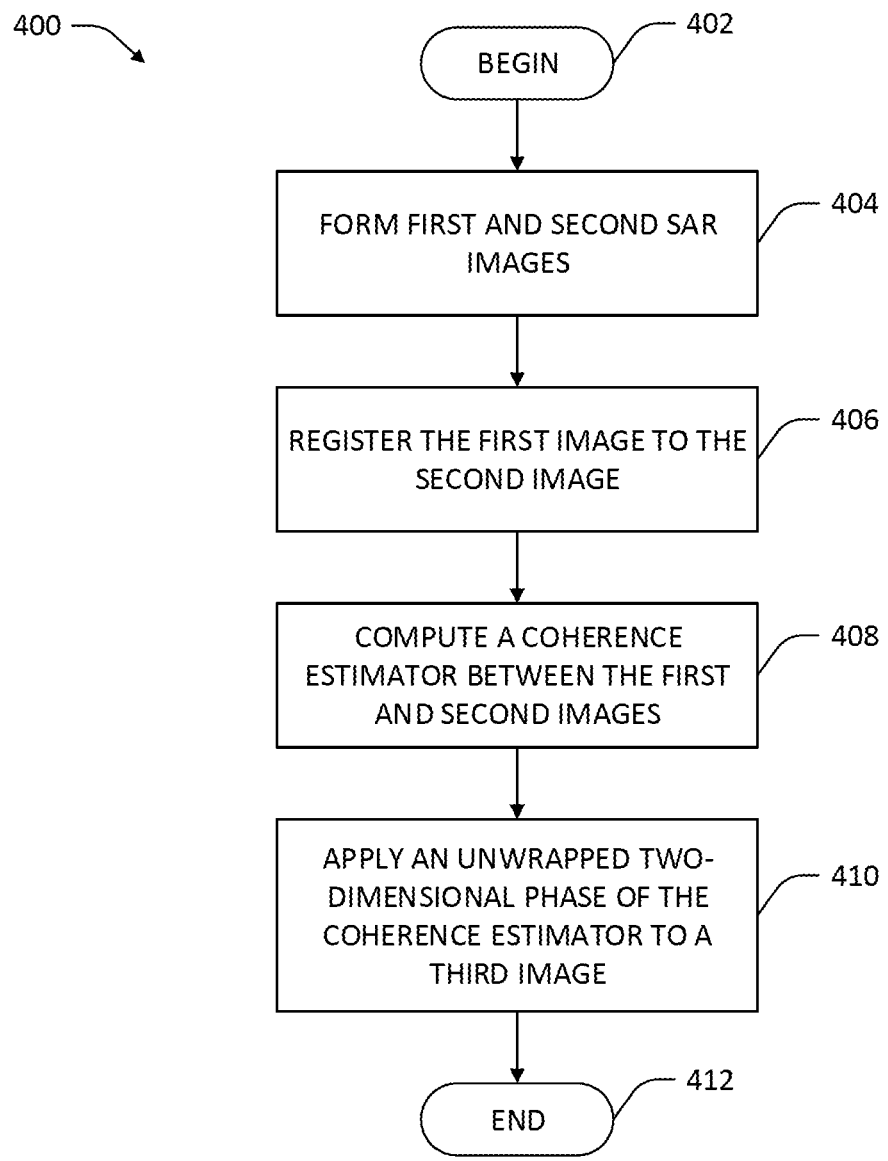
FIG. 4 is a flow diagram that illustrates an exemplary methodology for correcting a spatially-variant phase offset between two SAR images.
Figure 5:
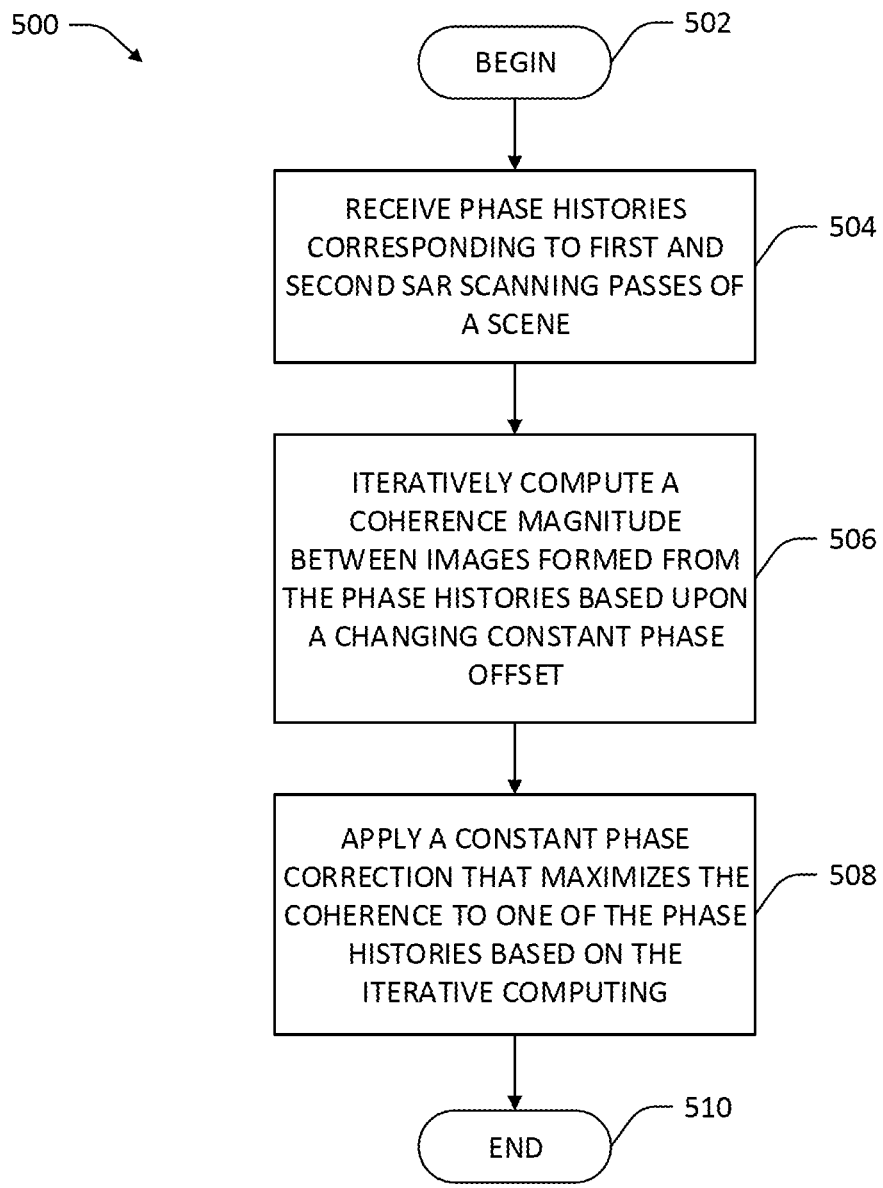
FIG. 5 is a flow diagram that illustrates an exemplary methodology for correcting a constant phase offset between two SAR phase histories.

FIGS. 3-5 illustrate exemplary methodologies relating to mitigating interference artifacts and distortion in SAR imagery. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 that facilitates interference mitigation in multi-pass SAR imagery is illustrated. The methodology 300 begins at 302, and at 304 first and second phase histories are resampled to a common reference. The first and second phase histories are phase histories corresponding to first and second data collection passes of a SAR antenna mounted on a SAR platform. The first and second phase histories can be resampled to a common spectral coordinate system based upon collection parameters of the SAR antenna and the SAR platform during the first and second data collection passes to compensate for known motion of the SAR platform. A spatially-variant phase correction is applied to a first image at 306, wherein the first image is based upon a transform applied to the resampled first phase history. The spatially-variant phase correction is based upon joint processing of the first image and a second image, wherein the second image is based upon a transform applied to the resampled second phase history. At 308 a constant phase correction is applied to a third phase history generated from the spatially-variant-phase-corrected first image (i.e., a spatially-variant-phase-corrected phase history), thereby yielding a complete-phase-corrected phase history. The constant phase correction is a constant phase offset applied uniformly to phase values in the third phase history. The constant phase correction can be based upon an iterative search procedure wherein a constant phase offset applied to the third phase history is varied in each iteration until a magnitude of the coherence between the third phase history and the resampled second phase history is maximized. The value of the coherence-maximizing phase offset is applied to the third phase history as the constant phase correction to obtain the complete-phase-corrected phase history. At 310, data in the resampled second phase history can be replaced with data from the complete-phase-corrected phase history in order to mitigate interference artifacts in images generated based upon the resampled second phase history, whereupon the methodology 300 ends 312.

Referring now to FIG. 4, a methodology 400 that facilitates correcting a spatially-variant phase offset between SAR images is illustrated. The methodology 400 begins at 402 and at 404 first and second SAR images are formed from first and second phase histories that correspond to first and second scanning passes of a SAR platform, respectively. The first and second phase histories are matched according to missing data samples, such that the first and second phase histories have missing data samples at same locations. The first image is then registered to the second image at 406. Transform operations performed on the first image to register the first image to the second image are also applied to a third image. The third image is formed from a third phase history corresponding to the first scanning pass of the SAR platform. The third phase history is an unmatched phase history that has not been filtered to have missing data samples at same locations as another phase history. The first image can be registered to the second image using both images in their entirety, in a piecewise fashion between corresponding segments, or a combination of both. After the first image is registered to the second image, a coherence estimator is computed between the first and second images. In an example, the coherence estimator can have a computed value for each pixel location in the first image. At 410, an unwrapped two-dimensional phase of the coherence estimator is applied to the third image, thereby correcting for a spatially-variant phase offset between the first and second images, whereupon the methodology 412 ends.

Referring now to FIG. 5, a methodology 500 that facilitates correcting a constant phase offset between two SAR phase histories is illustrated. The methodology 500 begins at 502, and at 504 first and second phase histories are received that correspond to first and second SAR scanning passes of a scene. In an exemplary embodiment, the first and second phase histories can be phase histories for which a spatially-variant phase offset between the phase histories has been corrected. At 506, a magnitude of coherence between images formed from the first and second phase histories is iteratively computed based upon an iteratively changing constant phase offset. In an example, desirably replaced data samples (e.g., missing or zero-valued data samples) in the second phase history can be substituted with values from the first phase history, and a constant phase offset can be applied to the substituted samples in the second phase history in each iteration, wherein the constant phase offset is changed by a fixed amount in each iteration. The coherence magnitude between first and second images formed from the first and second phase histories, respectively, is computed in each iteration. The iterative computing can continue until a maximizing value for the constant phase offset is found that causes the coherence magnitude to be greater than the coherence magnitude in the previous iteration and greater than the coherence magnitude in the subsequent iteration. At 508, a constant phase correction that maximizes the magnitude of the coherence between the first and second images is applied to the substituted samples in the second phase history based upon the iterative computing. Continuing the example above, the maximizing value for the constant phase offset identified by the iterative computing of the coherence magnitude can be applied to data samples from the first phase history when they replace missing values in the second phase history. At 510 the methodology 500 ends.

Figure 6:
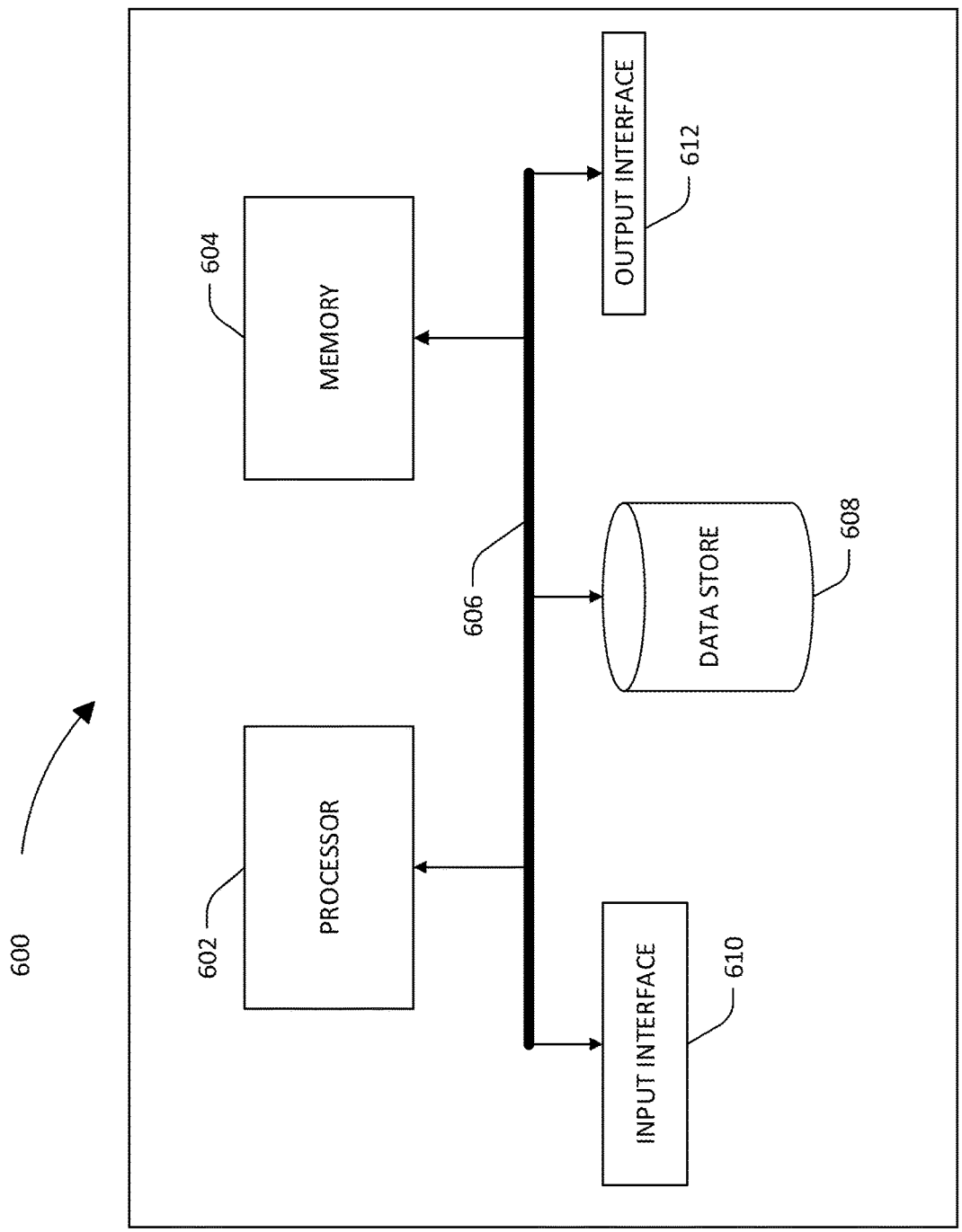
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 can be used in a system that receives SAR phase history data for multiple passes of a SAR platform over a same scene and processes the phase history data to mitigate interference artifacts in SAR images generated from the phase history data. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store SAR phase history data, SAR images, signal processing data, image processing data, etc.

The computing device 600 additionally includes a data store 608 that is accessible by the processor 602 by way of the system bus 606. The data store 608 may include executable instructions, SAR phase history data, SAR imagery etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   at least one processor; and
   memory comprising instructions that, when executed by the at least one processor, cause the at least one processor to perform acts comprising:
     responsive to receiving a first synthetic aperture radar (SAR) phase history of a scene corresponding to a first pass of a SAR platform and a second SAR phase history of the scene corresponding to a second pass of the SAR platform, resampling the first phase history and the second phase history to a common coordinate system;
     applying a spatially-variant phase correction to a first image, the first image based upon the resampled first phase history, the spatially-variant phase correction based upon a spatially-variant phase offset between a second image and a third image, wherein the second image is based upon the second resampled phase history and the third image is based upon the first resampled phase history;
     applying a constant phase correction to a third phase history, the third phase history based upon the spatially-variant phase-corrected first image, the constant phase correction based upon a constant phase offset between the third phase history and the resampled second phase history; and
     replacing first data in the phase-corrected third phase history with second data in the resampled second phase history.

2. The system of claim 1, the acts further comprising generating a fourth image based upon the phase-corrected third phase history, the phase-corrected third phase history having the first data replaced with the second data.

3. The system of claim 1, wherein the first image is an image generated by an invertible image formation algorithm.

4. The system of claim 3, wherein the third phase history is a phase history generated by an inverse of the invertible image formation algorithm.

5. The system of claim 1, wherein the first data in the phase-corrected third phase history corresponds to filtered data in the first phase history.

6. The system of claim 1, the acts further comprising:
   responsive to resampling the first and second phase histories:
     filtering third data in the first phase history, the third data corresponding to a location of missing data in the second phase history; and
     filtering fourth data in the second phase history, the fourth data corresponding to a location of missing data in the first phase history; and
   wherein the third image is based upon the filtered first phase history and the second image is based upon the second filtered phase history.

7. The system of claim 6, wherein the missing data in the first phase history and the missing data in the second phase history are filtered data values.

8. The system of claim 1, the acts further comprising:
   registering the third image to the second image;
     computing a maximum likelihood coherence between the registered third image and the second image;
     unwrapping a two-dimensional phase of the maximum likelihood coherence; and
   applying the unwrapped two-dimensional phase to the first image.

9. The system of claim 8, wherein applying the spatially-variant phase correction further comprises autofocusing the second and third images prior to registering the third image to the second image.

10. The system of claim 8, wherein registering the third image to the second image comprises:
    registering an entirety of the third image with an entirety of the second image; and
    registering each of a plurality of segments of the third image with a corresponding segment of the second image.

11. The system of claim 1, wherein applying the constant phase correction to the third phase history comprises:
    iteratively calculating a coherence magnitude between an image formed from the third phase history and an image formed from the resampled second phase history, wherein a value of the constant phase correction applied to the third phase history is changed in each iteration; and
    applying the value of the constant phase correction to the third phase history that maximizes the iteratively calculated coherence magnitude between the image formed from the third phase history and the image formed from the resampled second phase history.

12. A method, comprising:
    responsive to receiving a first synthetic aperture radar (SAR) phase history of a scene corresponding to a first collection time and a second SAR phase history of the scene corresponding to a second collection time, resampling the first phase history and the second phase history to a common reference;
    applying a spatially-variant phase correction to a first image, the first image based upon the resampled first phase history, the spatially-variant phase correction based upon a spatially-variant phase offset between a second image and a third image, the second image based upon the second resampled phase history, the third image based upon the first resampled phase history;
    transforming the phase-corrected first image to a third phase history;
    applying a constant phase correction to the third phase history based upon a constant phase offset between the third phase history and the resampled second phase history, wherein applying the constant phase correction to the third phase history results in a fourth phase history; and
    replacing first data in the second phase history with second data in the fourth phase history to mitigate interference.

13. The method of claim 12, wherein the first data corresponds to filtered data in the second phase history.

14. The method of claim 12, further comprising:
    responsive to resampling the first and second phase histories:
      filtering third data in the first phase history, the third data corresponding to a location of missing data in the second phase history; and
      filtering fourth data in the second phase history, the fourth data corresponding to a location of missing data in the first phase history; and wherein the third image is based upon the filtered first phase history and the second image is based upon the second filtered phase history.

15. The method of claim 14, wherein the missing data in the first and second phase histories is filtered data.

16. The method of claim 12, wherein applying the spatially-variant phase correction comprises:
registering the third image to the second image;
computing a maximum likelihood coherence estimator between the registered third image and the second image;
unwrapping a two-dimensional phase of the maximum likelihood coherence estimator; and
applying the unwrapped two-dimensional phase to the first image.

17. The method of claim 16, wherein applying the spatially-variant phase correction further comprises autofocusing the second and third images prior to registering the third image to the second image.

18. The method of claim 16, wherein registering the third image to the second image comprises:
registering an entirety of the third image with an entirety of the second image; and
registering each of a plurality of segments of the third image with a corresponding segment of the second image.

19. The method of claim 12, wherein applying the constant phase correction to the third phase history comprises:
iteratively calculating a coherence magnitude between an image formed from the third phase history and an image formed from the resampled second phase history, wherein a value of the constant phase correction applied to the third phase history is changed in each iteration; and
applying the value of the constant phase correction to the third phase history that maximizes the iteratively calculated coherence magnitude between the image formed from the third phase history and the image formed from the resampled second phase history.

20. A computer-readable medium comprising instructions that, when executed by a processor, perform the following acts:
responsive to receiving a first phase history corresponding to a first synthetic aperture radar (SAR) imaging scan of a scene and a second phase history corresponding to a second SAR imaging scan of the scene, resampling the first phase history and the second phase history to a common coordinate system;
filtering at least a portion of the resampled first phase history based upon a filtered portion of the second phase history;
forming first and second images based upon the first filtered phase history and the second resampled phase history, respectively;
executing an autofocus algorithm over each of the first and second images;
registering the first image to the second image;
calculating a coherence estimator between the registered first image and the second image;
unwrapping a two-dimensional phase of the coherence estimator;
applying a phase correction to a third image, the third image based upon the first phase history, the phase correction based upon the unwrapped two-dimensional phase;
executing a transform over the phase-corrected third image to generate a third phase history;
applying a constant phase offset to the third phase history based upon a constant phase difference between the second resampled phase history and the third phase history; and
generating an image of the scene in the first SAR imaging scan based at least in part upon the phase-offset third phase history and a value of the second resampled phase history.

* * * * *